UNITED STATES PATENT OFFICE.

HERMANN PLAUSON, OF HAMBURG, GERMANY, ASSIGNOR TO D. R. ROTMAN, OF NEW YORK, N. Y.

MANUFACTURE OF ARTIFICIAL WOOD OR OTHER PLASTIC BODIES 1,397,144.     Specification of Letters Patent.     Patented Nov. 15, 1921.

No Drawing.     Application filed February 3, 1921. Serial No. 443,422.

*To all whom it may concern:*

Be it known that I, HERMANN PLAUSON, Esthonian subject, residing at Hamburg, Germany, have invented a certain new and useful Manufacture of Artificial Wood or other Plastic Bodies, (for which I have filed an application in Germany March 15, 1919,) of which the following is a specification.

It is known that plastic masses or artificial wood can be prepared by pressure and heat applied to mixtures of sawdust and the like and binding agents if desired with the addition of mineral fillers and coloring materials. Soluble natural or artificial resins especially phenol-formaldehyde condensation products have been employed as binding agents.

The present invention depends on the discovery that an artificial resin obtained from acetone and formaldehyde in presence of alkali exerts an extremely high binding action on fillers such as ground wood, straw, paper, peat, cellular materials, asbestos and the like. To obtain the best results it appears to be necessary that the synthesis of this artificial resin shall take place or be completed in presence of the filler itself because the artificial resin obtained from these raw materials does not appear to be soluble in any organic solvent and it possesses an extraordinary resistant capacity against alkalis and acids. So far therefore I have not found it possible to dissolve this product and to impregnate the filler therewith, and simple admixture of the artificial resin with the filler does not lead to good results. But if the artificial resin is prepared in presence of the filler, it is precipitated thereon very uniformly in a fine state of division. A much more intimate contact and impregnation of filler and binding agent is obtained so that each particle of the filler is fixed by the requisite quantity of artificial resin. This feature is of the utmost importance for obtaining the best results according to the present invention. Owing to the intimate combination between the binding agent and the filler, artificial wood or like plastic masses can be obtained by pressing with heat and these masses are of the most extreme strength and of a homogeneity which could not be hitherto attained. Owing to the good properties of the artificial resin, these masses are at the same time acid- and alkali-resistant to the highest extent and are not attacked by organic solvents.

The artificial resin according to the present invention is an entirely different body from the known phenol formaldehyde condensation products. It has been hitherto proposed to condense acetone and phenol to dioxydiphenyldimethyl-methane by using acids and then to condense this compound (which is not a ketone) with formaldehyde in presence of alkali to an artificial resin which like the ordinary phenol-formaldehyde condensation products is soluble in acetone and alcohol and in alkali. It will be seen that the products of this complex condensation are different in properties and they cannot be regarded as condensation products of aldehydes and ketones.

The resin produced according to the present invention is distinguished by its almost complete insolubility and resistant powers. It is true that phenol formaldehyde condensation products can be made resistant to a certain extent if they are subjected to a tedious process of hardening.

According to the present invention, however, inert and extremely stable plastic or artificial masses can be obtained which represents a substantial technical advance.

The raw materials of the artificial resin can consist of acetone and formaldehyde although other ketones or aldehydes may be employed. The condensation can take place under increased pressure if desired.

The artificial wood or plastic masses prepared according to the present invention can be further modified in properties by the addition of suitable substances. For instance they can be changed in appearance or cheapened by the addition of fillers; their color can be changed by the addition of coloring agents; the elasticity can be increased by the addition of natural rubber resin; the insulating power can be increased by the addition of natural or artificial resin, shellac, cellulose esters and the like, and the power of obtaining a high polish can be increased by the addition of oils, waxes or the like. Cement, graphite, talc, kaolin, heavy spar, lithopone, glass powder etc, can also be used as fillers.

The process will be illustrated by the following examples:

Example 1.

A mixing drum having a lid is charged with a mixture of 58 parts of acetone and 100 parts of 30% formaldehyde together with 100 parts of ground wood, peat, straw, cellulose, paper or the like, if desired with the addition of cement, graphite, glass powder, earth or metal colors or the like inorganic powders. When the whole is intimately mixed, ammonia gas is introduced into the drum with continual agitation under a pressure of 1 to 3 atmospheres. Heat is evolved and the reaction takes place in a stormy manner; it is complete in 10 to 15 minutes. An extremely fine resinous layer is thus deposited on the powder. The excess of ammonia is removed and the water evaporated by continual agitation with the aid of a vacuum.

The dry powder obtained in this way can be pressed into molds or stamped into desired objects at a pressure of 150 to 500 atmospheres or more at a temperature of 120 degrees to 200 degrees C. Masses are thus obtained which are inert toward alkalis, acids and almost all organic solvents and possess high insulating powers, high strength against fracture and can be worked well, e. g. by sawing, cutting, boring, etc. A mass is obtained at low temperatures at a pressure of 200 to 250 atmospheres which behaves like natural wood, but the strength is considerably greater; at higher temperatures and pressures, the artificial mass possesses the most extreme strength and high polish.

Example 2.

A solution of 30 parts of acetone-soluble rubber resin in acetone is added to a mixture of 60 parts of acetone and 100 parts of 40% formaldehyde. The mixture so obtained is mixed as in Example 1 in a mixing drum with 150 to 250 parts of wood meal or other pulverulent substances and then subjected to the actions of a 10% alcoholic or aqueous caustic soda solution. The reaction is complete in half an hour without the action of pressure. After washing out the alkali and evaporating off the excess of acetone and the water, the mass can be pressed as in Example 1 to various objects as desired. The so-obtained artificial wood can be well polished and is softer and more elastic than that obtained according to Example 1 and feels somewhat fatty like palm-wood. By the addition of inorganic or organic coloring matters before or after the reaction the mass can be suitably colored. The process can be modified in that the acetone formaldehyde mixture can be first caused to interact in presence of alkalis and the fibrous material or powder can be added shortly before the end of the reaction. The reaction can also be induced by other alkaline reagents, e. g. ammonia, alkali carbonates, alkali sulfids or hydroxids of the alkaline earths instead of alkalis.

Instead of rubber resins, acetone-soluble phenol condensation products or natural resins, oils, waxes may be added and the artificial wood can be given various properties thereby. Obviously all these substances can be added after the reaction. Dry wood meal powder is best worked in such cases with acetone and formaldehyde and alkali and the moisture sucked off *in vacuo;* the added substances are then added dissolved in a suitable solvent. After distillation of the solvent, the so-obtained dry powder can be molded as in Example 1. As added substances, hemoglobin, shellac, cellulose esters, rubber, ebonite, etc., may be employed. These can also be added in the form of powder but completely homogeneous products are only obtained by performing the condensation or completing the condensation in presence of the filler. Instead of aqueous formaldehyde its polymers can be used or hexamethylenetetramin or substances which liberate formaldehyde. Other aldehydes can be employed, for instance acetaldehyde, but the alkali must then be allowed to react at a fairly high pressure e. g. 3 to 10 atmospheres. Instead of acetone, other ketones can be used such as methyl ethyl ketone, diethyl ketone or aromatic ketones.

I claim as my invention—

1. A plastic composition comprising a filler and a resin condensed from an aldehyde and a ketone by an alkaline condensing agent.

2. A plastic composition comprising a filler and a resin condensed from an aldehyde and a ketone by an alkaline condensing agent.

3. A plastic composition comprising a filler and a resin condensed from an aldehyde and acetone by an alkaline condensing agent.

4. A plastic composition comprising a filler and a resin condensed from formaldehyde and acetone by an alkaline condensing agent.

5. A plastic composition comprising a filler and a resistant, insoluble resin condensed from an aldehyde and a ketone in presence of an alkaline reagent.

6. A fashioned article comprising a filler and a resin condensed from an aldehyde and a ketone in presence of an alkaline reagent and consolidated by pressure.

In witness whereof, I have hereunto signed my name this 30 day of Decr. 1920, in the presence of two subscribing witnesses.

HERMANN PLAUSON.

Witnesses:
J. VETA ARMSTRONG,
W. ST. BEERTON.